(12) United States Patent
Seitzer et al.

(10) Patent No.: US 7,740,443 B2
(45) Date of Patent: Jun. 22, 2010

(54) TRANSPIRATION CLEARANCE CONTROL TURBINE

(75) Inventors: Kenneth Edward Seitzer, Cincinnati, OH (US); Wojciech Sak, West Chester, OH (US); Zhifeng Dong, Cincinnati, OH (US); Robert Paul Ziegler, Fort Thomas, KY (US); William Lee Herron, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 654 days.

(21) Appl. No.: 11/599,791

(22) Filed: Nov. 15, 2006

(65) Prior Publication Data
US 2008/0112797 A1    May 15, 2008

(51) Int. Cl.
*F01D 11/08* (2006.01)
(52) U.S. Cl. .................. 415/116; 415/126; 415/175
(58) Field of Classification Search .......... 415/115, 415/116, 173.1, 126, 128, 175, 176, 177; 416/96 R; 60/806
See application file for complete search history.

(56) References Cited

U.S. PATENT DOCUMENTS

| 4,023,731 | A | * | 5/1977 | Patterson | 236/93 R |
| 4,553,901 | A | | 11/1985 | Laurello | |
| 5,205,115 | A | * | 4/1993 | Plemmons et al. | 60/806 |
| 5,205,708 | A | | 4/1993 | Plemmons et al. | |
| 5,281,085 | A | | 1/1994 | Lenahan et al. | |

OTHER PUBLICATIONS

General Electric Company, "CF6-80C2 Engine Airflow FADEC Control," on sale and in public us in USA for more than one year before Sep. 1, 2006; two pages.
General Electric Company, "GE90-115B Engine Airflow," Jun. 2006; three pages.

* cited by examiner

*Primary Examiner*—Edward Look
*Assistant Examiner*—Dwayne J White
(74) *Attorney, Agent, or Firm*—William S. Andes; Francis L. Conte

(57) ABSTRACT

A row of turbine blades is surrounded by a turbine shroud. The shroud is supported by a turbine case having a pair of radially outwardly extending rails. The rails are perforate for channeling therethrough control air to control thermal radial movement of the case, and in turn radial position of the shroud supported therefrom.

28 Claims, 5 Drawing Sheets

US 7,740,443 B2

TRANSPIRATION CLEARANCE CONTROL TURBINE

BACKGROUND OF THE INVENTION

The present invention relates generally to gas turbine engines, and, more specifically, to active clearance control therein.

In a gas turbine engine, air is pressurized in a compressor and mixed with fuel in a combustor for generating hot combustion gases. Energy is extracted from the gases in a high pressure turbine (HPT) which is joined by one drive shaft to the compressor.

In a typical turbofan aircraft engine, a fan is mounted upstream from the compressor and is powered by a low pressure turbine (LPT) mounted downstream of the HPT. In marine and industrial (M & I) applications, the LPT powers an external drive shaft for powering a propulsion system or electrical generator in typical applications.

The compression and combustion cycles introduce energy into the pressurized air, with energy extracted from the combustion gases in the turbine stages. Since the HPT is subject to the hottest combustion gases discharged from the combustor, the various components thereof are typically cooled by bleeding a portion of the pressurized air from the compressor. Any air used for turbine cooling is lost from the combustion cycle and therefore reduces overall efficiency of the engine.

Furthermore, each turbine stage includes a row of turbine rotor blades extending radially outwardly from a supporting rotor disk, with the radially outer tips of the blades being mounted inside a surrounding turbine shroud. The shroud is stationary and supported from a surrounding annular turbine case for maintaining a small radial clearance or gap therebetween.

The turbine blades share a common airfoil profile which is optimized for maximizing the efficiency of energy extraction from the combustion gases. Leakage of the combustion gases at the blade tip gaps further decreases efficiency of the engine.

Accordingly, the radial blade tip clearance is made as small as practical but cannot be too small or undesirable rubbing of the blade tips against the turbine shroud can lead to undesirable damage or shortened component life.

Although the blade tip clearance has an initial magnitude when the engine is cold, the size of the gap or clearance will change as the engine is operated and the various components of the turbine are heated or cooled to different temperatures.

Furthermore, as the engine is operated through various levels of power, the turbine components thermally expand and contract which correspondingly affects the size of the blade tip clearance. Since the turbine blades are directly exposed to the hot combustion gases during operation, they are heated quickly and expand radially outwardly toward the surrounding turbine shroud.

Correspondingly, the turbine shroud is a stationary component supported from the surrounding case and therefore has a different rate of thermal expansion and contraction than the turbine blades mounted on their supporting rotor disk.

The typical turbofan aircraft engine initially operates at a low power, idle mode and then undergoes an increase in power for takeoff and climb operation. Upon reaching cruise at the desired altitude of flight, the engine is operated at lower, or intermediate power setting. The engine is also operated at lower power as the aircraft descends from altitude and lands on the runway, following which thrust reverse operation is typically employed with the engine again operated at high power.

In the various transient modes of operation of the engine where the power increases or decreases, the turbine shroud and blades expand and contract differently, which in turn affects the blade clearance. In one particularly problematic mode of operation called reburst, engine power is quickly increased which correspondingly causes the turbine rotor blades to expand radially outwardly at a greater rate than that of the surrounding turbine shroud. The radial clearance therebetween will therefore decrease during this transient phase.

And, in order to avoid undesirable blade tip rubs against the turbine shroud the initial blade tip clearance must be set sufficiently large, which as indicated above will decrease overall efficiency of the engine due to blade tip leakage.

In order to better control the variable blade tip clearance during engine operation, various clearance control configurations are known, including active clearance control (ACC). In active clearance control, relatively cool fan air or relatively hot compressor bleed air, or a mixture thereof, are channeled to the turbine case from which the shrouds are suspended. The case is either heated or cooled as required to minimize the blade tip clearance specifically during cruise operation of the aircraft where maximum efficiency is desired.

Nevertheless, the effectiveness of conventional active clearance control systems is limited and still requires a relatively large nominal blade tip clearance to avoid undesirable tip rubs, particularly during the reburst condition.

Accordingly, it is desired to provide a gas turbine engine having improved active clearance control and efficiency.

BRIEF DESCRIPTION OF THE INVENTION

A row of turbine blades is surrounded by a turbine shroud. The shroud is supported by a turbine case having a pair of radially outwardly extending rails. The rails are perforate for channeling therethrough control air to control thermal radial movement of the case, and in turn radial position of the shroud supported therefrom.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
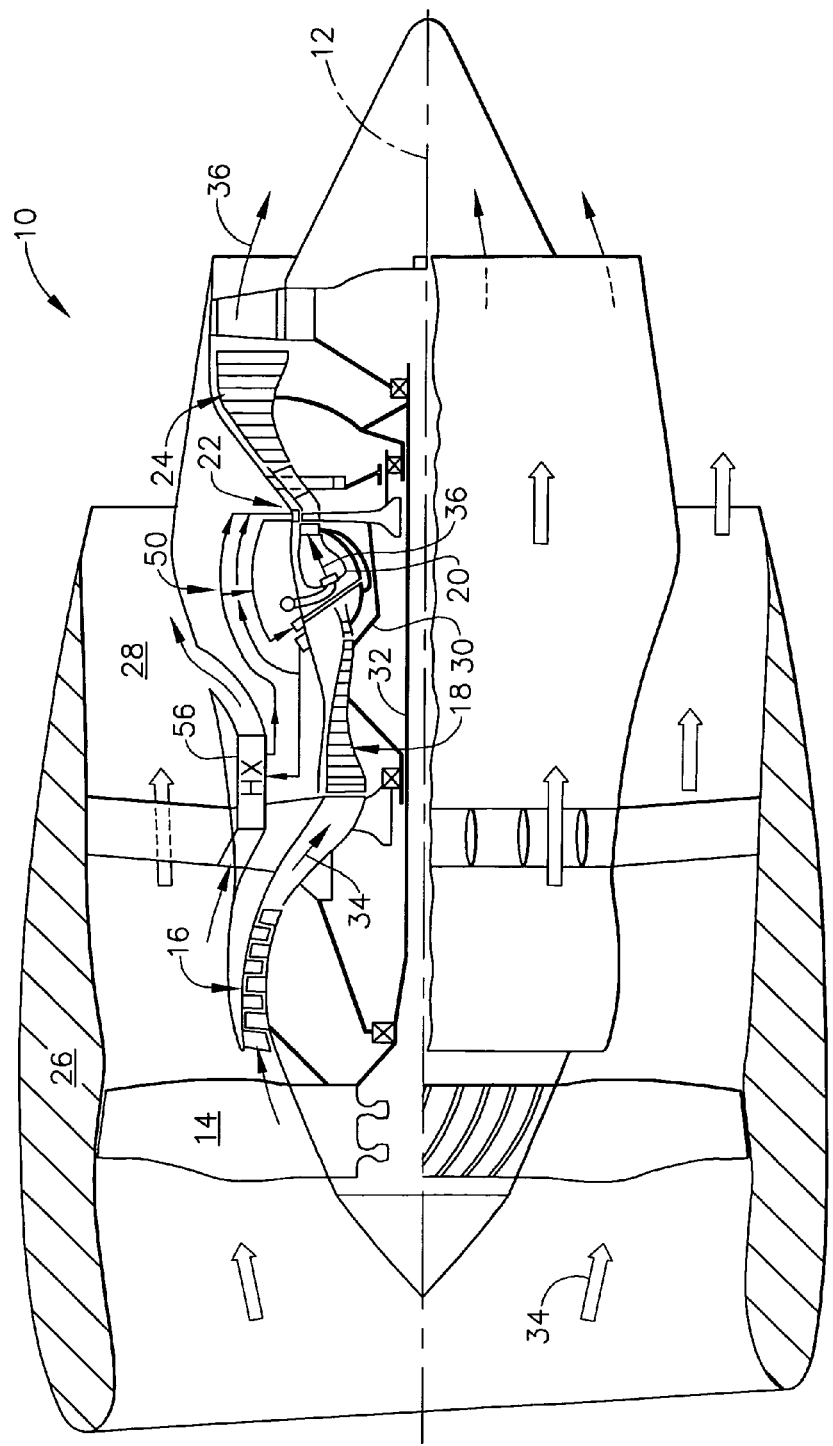
FIG. 1 is an axial sectional schematic view of an exemplary turbofan aircraft gas turbine engine.

Illustrated schematically in FIG. 1 is an exemplary turbofan aircraft gas turbine engine 10. The engine is axisymmetrical about a longitudinal or axial centerline axis 12 and is suitably mounted to the wing or a fuselage of an aircraft (not shown) for powering an aircraft in flight in an exemplary application.

The engine includes in serial flow communication a fan 14, a low pressure or booster compressor 16, a high pressure (HP) compressor 18, an annular combustor 20, a high pressure turbine (HPT) 22, and a low pressure turbine (LPT) 24.

An annular nacelle 26 surrounds the fan 14 and defines an annular bypass duct 28 extending aft around the booster compressor 16. A first drive shaft 30 joins the HPT 22 to the HP compressor 18, and a second drive shaft 32 joins the LPT 24 to the fan 14 and booster compressor 16. The two drive shafts are suitably mounted in bearings in corresponding frames within the engine in a conventional configuration of the various engine components described above.

During operation, ambient air 34 enters the inlet of the engine and is pressurized in part by the fan 14 and discharged through the bypass duct 28 for providing a majority of propulsion thrust. Some of the air 34 passing the fan enters the booster compressor 16 and undergoes a further compression cycle in the multiple axial stages thereof, with additional compression also being provided in the HP compressor 18 in the multiple axial stages thereof.

The pressurized air 34a is discharged from the compressor and suitably mixed with fuel in the combustor 20 for generating hot combustion gases 36. Energy is extracted from the combustion gases 36 in the HPT 22 to drive the first shaft 30 and power the HP compressor 18. Additional energy is extracted from the combustion gases in the LPT 24 to drive the second shaft 32 and power the fan 14 and booster compressor 16.

Figure 2:
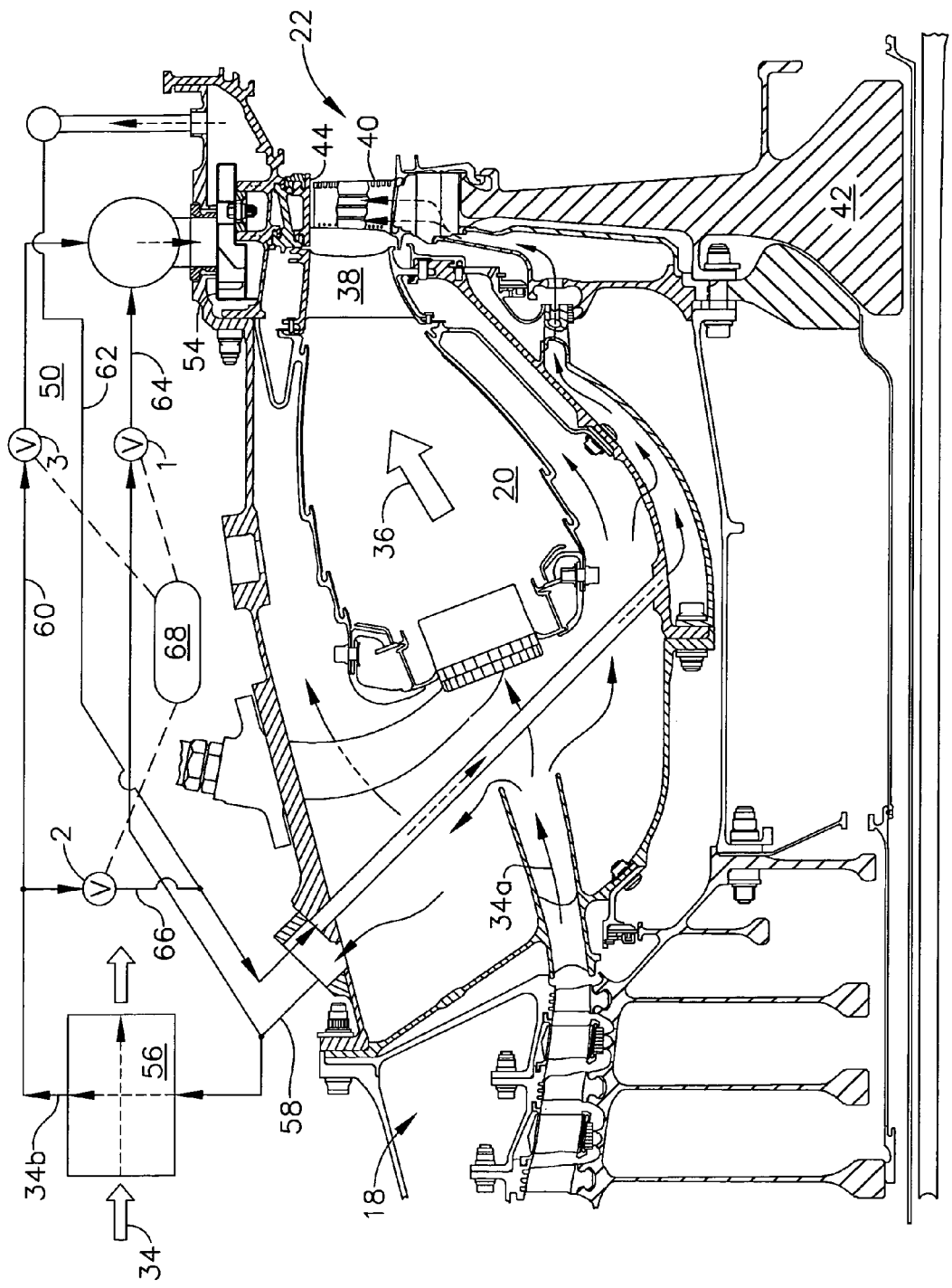
FIG. 2 is an enlarged, partly schematic, view of a portion of the core engine illustrated in FIG. 1 including an active clearance control system therein.

The engine as described above is conventional in configuration and operation and includes multiple compression stages and multiple turbine stages. FIG. 2 illustrates in more detail the basic core engine including the high pressure compressor 18, annular combustor 20, and HPT 22 disposed in serial flow communication.

The HPT 22 includes a first stage or HP turbine nozzle having a row of stator vanes 38 suitably mounted in outer and inner bands. Following the vanes is a single row of HP turbine blades 40 removably mounted to the perimeter or rim of a first stage or HP rotor disk 42. The blades 40 are hollow and include conventional internal cooling channels. The disk 42 is fixedly joined to the first drive shaft 30 which in turn is fixedly joined to the rotor disks supporting the compressor blades of the high pressure compressor 18.

Figure 3:
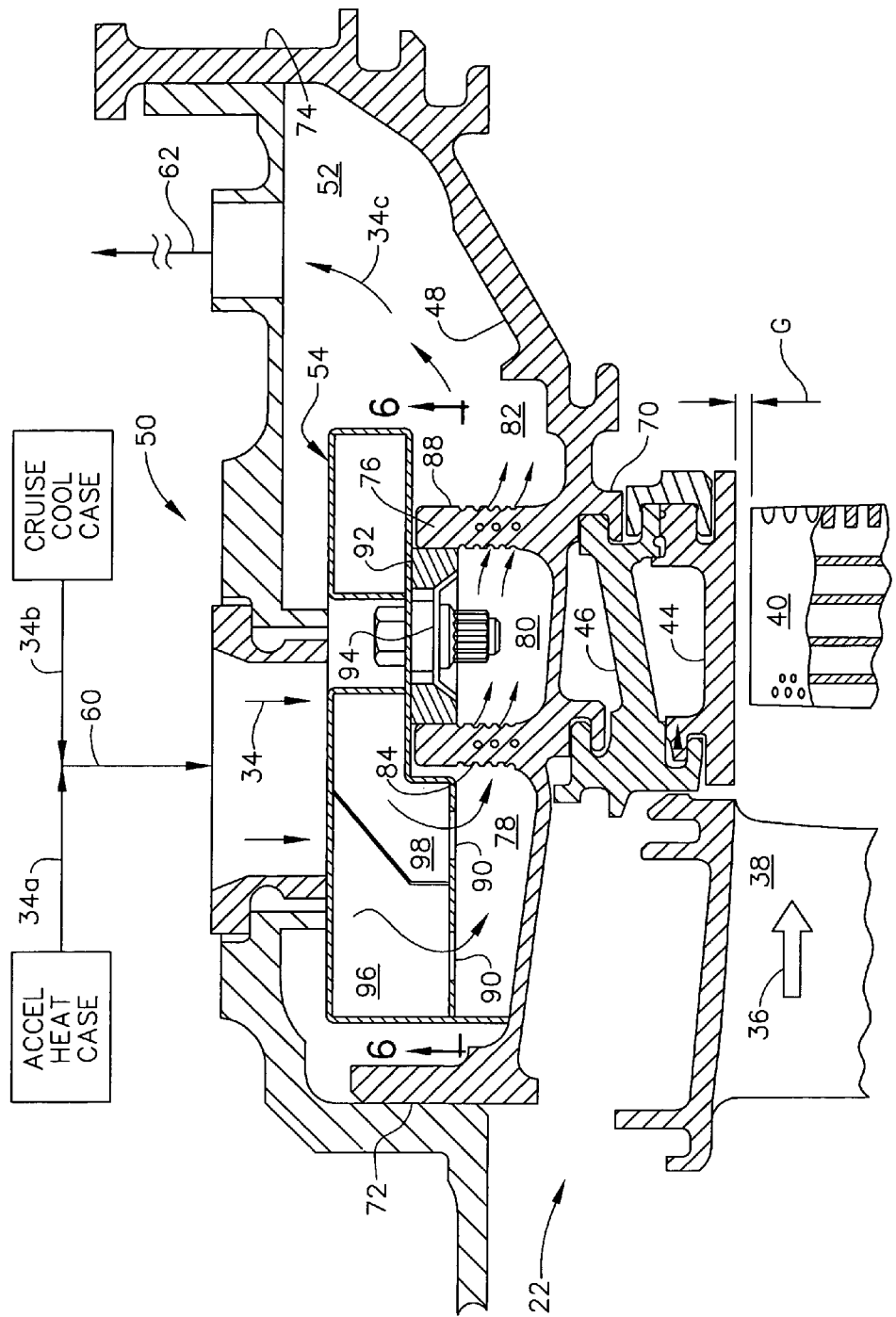
FIG. 3 is an enlarged schematic view of the clearance control system illustrated in FIG. 2.

FIG. 3 shows in more detail the typical location of the radially outer tips of the turbine blades 40 mounted radially inside a surrounding turbine shroud 44. The shroud is typically formed in circumferential segments, with a row of the discrete turbine shrouds 44 being suitably suspended from a supporting annular hanger 46, also formed in segments.

The hanger in turn is conventionally mounted to a portion of the surrounding annular turbine casing or case 48. In this way, the row of turbine shrouds 44 is mounted stationary in the engine and surrounds the radially outer tips of the row of rotary turbine blades 40, and spaced therefrom to define a relatively small radial clearance or gap G having an initial or nominal size.

As indicated above, leakage of the combustion gases 36 through the gap G during operation correspondingly reduces efficiency of the turbine and the engine. And, differential thermal expansion and contraction of the turbine blades 40 mounted on their supporting rotor disk and the suspended turbine shrouds 44 change that nominal radial clearance during the various modes of operation of the engine from takeoff to cruise at elevation and to landing on the runway.

FIGS. 2 and 3 illustrate schematically an active clearance control (ACC) apparatus or system 50 which is selectively used to cool or heat the turbine case 48 that supports the row of turbine shrouds 44. The turbine case 48 itself therefore defines an ACC mount that supports the hanger 46 and shrouds 44 in turn to control the size of the radial tip clearance or gap G.

In particular, the HP turbine 22 includes an annular chamber or plenum 52 which surrounds the turbine case 48. An annular distribution manifold 54 is suitably mounted inside the plenum 52 and is specifically configured to cooperate with improvements in the case 48 for increasing thermal response rate thereof.

An exemplary configuration of the ACC system 50 is initially illustrated in FIG. 1 installed inside the cowling of the core engine, with an air-to-air heat exchanger (HX) 56 suitably mounted in flow communication with the annular bypass duct 28. The heat exchanger itself may have any conventional configuration and includes a primary circuit through which the relatively cold fan air 34 is channeled for cooling the hot CDP air 34a in an independent, secondary circuit therein.

As shown in FIG. 2, this secondary circuit of the heat exchanger 56 is suitably joined by an inlet circuit 58 to the discharge end of the compressor 18 in flow communication therewith for channeling a portion of the compressor discharge air 34a through the heat exchanger wherein it is cooled by the bypass fan air 34 channeled through the primary circuit.

A compound distribution network is disposed in flow communication with the HX 56 for selectively channeling or distributing the cooled CDP air 34b from the HX 56 to the HPT 22 for actively controlling the magnitude or size of the radial clearance or gap G. The diverted compressor discharge air may also be used for blade cooling in a compound ACC system for significantly enhancing engine performance and efficiency.

FIG. 2 illustrates in part schematically the compound distribution network which includes a first circuit 60, a second circuit 62, a first bypass 64, and a second bypass 66. These network components may have any conventional flow channeling configurations such as tubes or conduits and manifolds for collecting, channeling, and distributing the compressor discharge air to the different turbine components with controlled flow.

The first circuit 60 is joined in flow communication from the discharge end of the secondary circuit in the heat exchanger 56 to the turbine case 48 for channeling the cooled compressor discharge air 34b thereto.

The second circuit 62 is joined in flow communication from the turbine case 48 to the first stage turbine blades 40 for channeling the spent cooling air 34c to the blades themselves for cooling thereof.

In particular, the second circuit 62 is suitably joined in flow communication with the plenum 52 which surrounds the turbine case 48 and encloses the distribution manifold 54 for collecting the spent control air 34c from outside the case 48 for subsequent use in cooling the turbine blades 40.

The second circuit 62 may include a row of transfer tubes extending radially through the outer and inner casings of the combustor to return the spent air 34c to the conventional flowpath which feeds the first stage blades 40, with the spent air being suitably mixed with hot CDP air to prevent over cooling of the blades.

The first bypass 64 is joined in flow communication from the discharge end of the compressor 18 directly to the turbine case 48 to bypass completely the heat exchanger 56 and provide the hot CDP air 34a directly to the case. The first bypass 64 may be joined to the inlet circuit 58 leading to the heat exchanger, or may be separately joined to the compressor discharge in any suitable manner for reducing the number of components, size, and weight.

The second bypass 66 is joined in flow communication from the outlet of the secondary circuit in the heat exchanger 56, in a portion of the first circuit 60 for example, to a suitable intermediate location in the second circuit 62 to bypass the turbine case 48 and provide the cooled compressor discharge air 34b directly to the second circuit for cooling the first stage blades 40.

In order to control and regulate the flow through the various conduits of the distribution network, the first bypass 64 includes a corresponding first control valve 1, the second bypass 66 includes a corresponding second control valve 2, and the first circuit 60 includes a corresponding third control valve 3 joined in serial flow communication in the corresponding flow conduits thereof.

The three valves 1,2,3 may have any conventional configuration such as electrically operated valves independently controlled by an electrical controller 68 of the engine as illustrated schematically in FIG. 2. The controller 68 may be a separate computer or may be a portion of the main control computer of the engine suitably configured in software for controlling the three valves 1-3 in the conventional manner of controlling other valves typically found in the engine.

The first valve 1 is joined in the first bypass circuit 64 for selectively varying or controlling the bypass flow of the hot compressor discharge air 34a to the turbine case.

The second valve 2 is joined in the second bypass circuit 66 for selectively controlling or varying the bypass flow of the cooled compressor discharge air 34b from the heat exchanger 56 directly to the turbine blades 40.

And, the third valve 3 is joined in the first flow circuit 60 for selectively controlling or varying the flow of the cooled compressor discharge cooling air 34b directly to the turbine case.

The controller 68 is operatively joined to the three valves 1,2,3 and is configured in suitable software for adjusting flow through those three valves and their corresponding flow circuits in three different and preferred modes of operation which respectively favor or prefer flow through different ones of the three valves with relatively high or maximum flow, with the other two valves having relatively low or minimum flow.

More specifically, a first mode of operation may be defined by substantially fully opening the first valve 1 while substantially closing the second and third valves 2,3 for correspondingly heating the turbine case 48 using the hot CDP air 34a delivered through the first bypass 64. This is the CDP air mode.

In a second mode of operation, the second valve 2 is instead substantially fully open, with the first and third valves 1,3 being substantially closed to bypass airflow to the turbine case 48, and instead channel the cooled CDP air 34b to the turbine blades. This is the ACC-OFF mode.

And, a third mode of operation is defined by substantially fully opening the third valve 3 while both the first and second valves 1,2 are substantially closed to channel the cooled CDP air 34b to the turbine case 48 for cooling thereof. This is the ACC-ON mode.

The first, or CDP air mode may be used in reburst or re-acceleration operation of the engine to channel the hot CDP air 34a through the distribution manifold 54 to quickly heat the turbine case 48 and increase the rate of thermal expansion thereof. In reburst, the hot combustion gases 36 are quickly heating the turbine blades 40 which expand radially outwardly toward the surrounding shrouds 44, but the fast heating of the supporting turbine case 48 correspondingly moves the turbine shrouds radially outwardly to avoid or reduce the likelihood of an undesirable tip rub. This benefit is new to turbofan engines and has not been previously possible in conventional active clearance control systems which lack this increased thermal response capability.

Correspondingly, typical active clearance control is effected only during intermediate power operation of the engine at aircraft cruise. Accordingly, the third or ACC-ON mode of operation may be used during cruise, as well as climb, for example to channel the cooled CDP air 34b from the heat exchanger to the distribution manifold 54 for cooling the turbine case 48 and thermally contracting the diameter of the row of turbine shrouds 44 to decrease the radial clearance G for improving cruise efficiency.

And, the second or ACC-OFF mode of operation may be used during engine idle, or takeoff, or decel to bypass the cooled CDP air 34b around the shroud mounting case 48 directly to the blades 40 for cooling thereof. Little or no airflow 34b is therefore provided through the distribution manifold 54 during ACC-OFF operation.

As indicated above in reference to FIG. 3, the HPT 22 includes the annular plenum 52 surrounding the turbine case 48, with the cooperating distribution manifold 54 disposed therein for effecting active clearance control of the blade tip clearance G. In particular, the distribution manifold 54 is joined in flow communication with the outlet end of the first circuit 60 for receiving the compressor discharge air therefrom which is then distributed from the manifold 54 to control the temperature of turbine case 48, and in particular control radial expansion and contraction of the turbine case 48, and thereby control the magnitude of the radial clearance G during operation.

It is noted that the distribution manifold 54 is joined in flow communication with the first circuit 60 for receiving the cooled compressor discharge air 34b, and is also disposed in flow communication with the first bypass 64 for receiving the uncooled, or originally hot compressor discharge air 34a. The two control valves 1,3 control the relative amounts of the hot and cooled discharge air 34a,b to control their thermal affect on the turbine case 48. The spent control air 34c from the turbine case 48 is collected inside the plenum 52 and channeled through the second circuit 62 to the row of turbine blades 40.

Since the turbine shroud 44 is supported from the surrounding turbine case 48, thermal expansion and contraction of the annular case 48 controls both the size of the radial clearance G during operation, as well as the circumferential variation or uniformity thereof.

Accordingly, the turbine case 48 has an improved configuration which cooperates with the distribution manifold 54 for significantly improving the thermal response rate of the case during both heating or cooling thereof as desired for improved clearance control.

Figure 4:
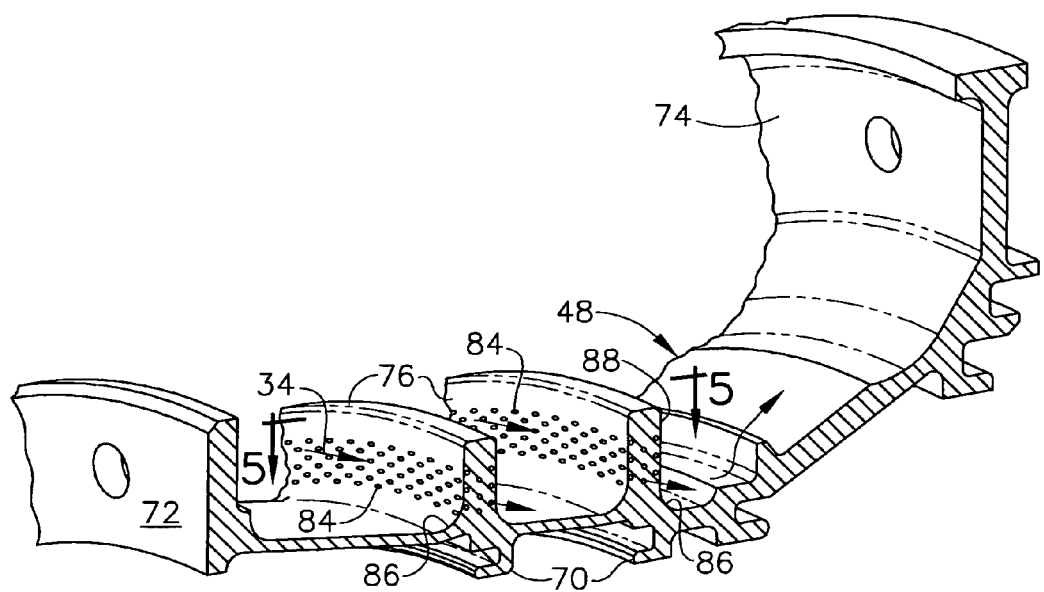
FIG. 4 is an isometric sectional view of a portion of the turbine case illustrated in FIG. 3 in isolation.
Figure 5:
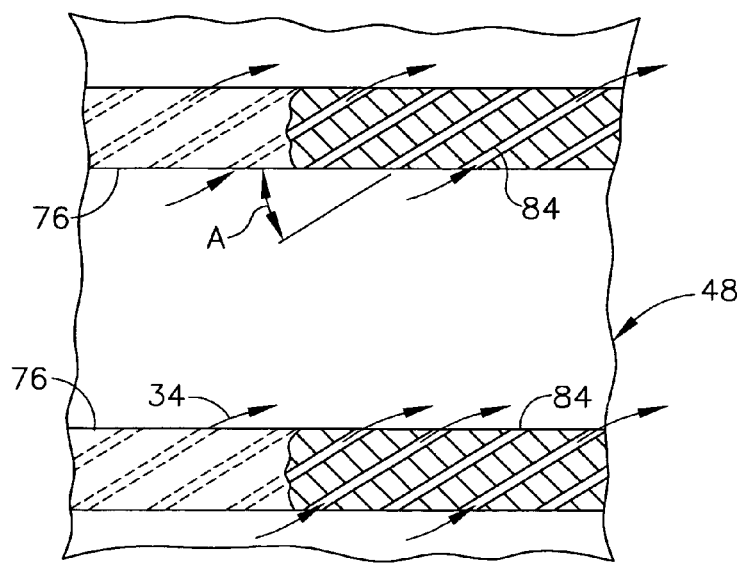
FIG. 5 is a circumferential sectional view of the control rails in the turbine case illustrated in FIG. 4 and taken along line 5-5.
Figure 6:
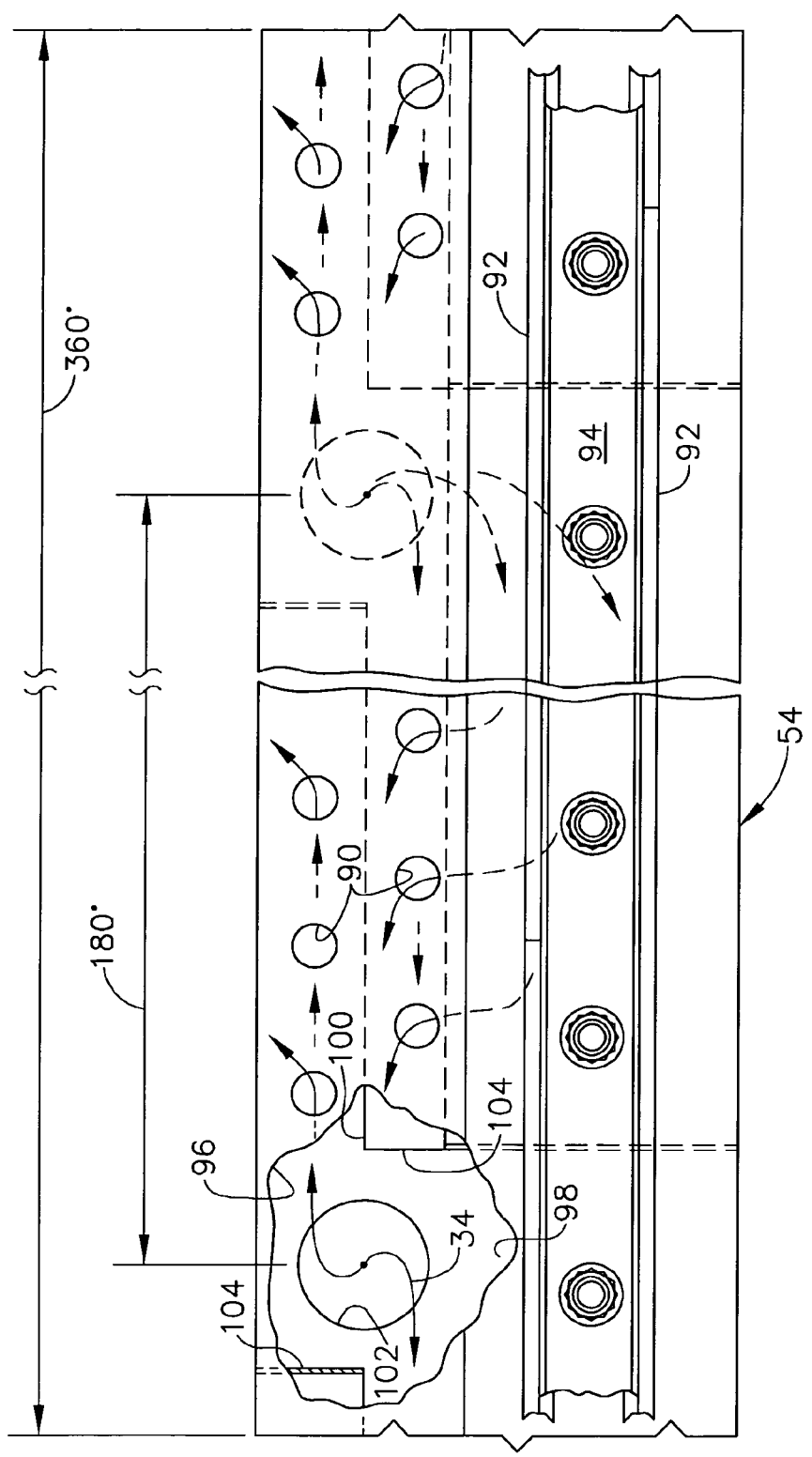
FIG. 6 is a planiform inside view of the distribution manifold illustrated in FIG. 3 and taken along line 6-6.

FIGS. 4 and 5 illustrate in isolation improved features of the turbine case 48, and FIG. 6 illustrates in isolation features of the distribution manifold 54 for specifically cooperating therewith.

The annular turbine case 48 illustrated in FIGS. 3 and 4 includes a pair of axially spaced apart supporting hooks 70 spaced axially between forward and aft mounting flanges 72,74. The two flanges 72,74 extend radially outwardly, and the two hooks 70 extend or project radially inwardly.

The mounting flanges have corresponding rows of holes therethrough which receive mounting bolts (not shown) for conventionally mounting the turbine case to adjoining portions of the engine case. The two hooks 70 extend circumferentially and may have any conventional configuration for supporting the annular hanger 46, which in turn includes additional hooks for supporting the turbine shroud 44, again in any conventional configuration.

The turbine case further includes a pair of integral control rings or rails 76 which are spaced axially apart from each other and extend radially outwardly above respective ones of the two hooks 70, generally in radial alignment therewith.

The rails 76 are full rings of generally rectangular cross section with conventional configurations except instead of being imperforate or solid in conventional fashion; they are perforate for channeling directly therethrough the pressurized control air, designated generally 34 in FIG. 3, to control the thermal radial expansion and contraction movement of the turbine case 48 at the underlying hooks 70, which in turn controls the radial position of the supported turbine shroud 44 and the magnitude of the radial clearance G.

The perforate rails 76 effect internal heat transfer therein when the control air is channeled therethrough for rapidly changing the temperature of the rails, which is significantly different than the external heat transfer of conventional solid rails subject to external impingement cooling thereof.

The two rails 76 shown in FIG. 3 are spaced axially apart from each other and from the opposite end flanges 72,74 to define corresponding forward, middle, and aft flow plenums or cavities 78,80,82 on opposite sides of the rails, with each cavity extending circumferentially around the perimeter of the case. The forward annular cavity 78 is defined axially between the forward flange 72 and the first rail 76. The middle annular cavity 80 is defined axially between the two rails 76 themselves. And, the aft annular cavity 82 is defined between the second rail and the aft flange 74.

As best shown in FIGS. 4 and 5, each of the two rails 76 includes a large plurality or multitude of small transpiration cooling holes 84 extending axially through the rails in flow communication between the adjoining cavities. The transpiration holes 84 are distributed over the entire annular extent of the rails 76 to maximize their heat transfer capability.

For example, the individual holes 84 may have a flow diameter of about 30 mils (0.75 mm) with a relatively close pitch spacing of a few diameters which will result in thousands of the transpiration holes distributed throughout each of the two rails 76.

The holes 84 are preferably inclined circumferentially through the rails 76 at an acute inclination angle A of about 30 degrees, for example, for correspondingly discharging the control air 34 circumferentially along the external surfaces of the rails 76 themselves.

In FIGS. 4 and 5, the transpiration holes 84 are inclined solely circumferentially, and not radially, but in alternate embodiments they could be additionally inclined radially for effecting compound inclination thereof.

In the various embodiments of the holes, the circumferential inclination is desired for maximizing the individual length of each hole 84 and therefore maximizing the available internal surface area subject to convection heat transfer during operation.

Furthermore, the circumferential inclination of the holes 84 promotes circumferential flow of the discharged control air around the external surface of the rails for further enhancing heat transfer thereof and increasing the thermal response rate of the two rails.

In order to maximize the internal density of the transpiration holes 84 in the two rails 76, the holes 84 are preferably arranged in several rows staggered both circumferentially along the length of the rails 76 and axially across the thickness of the rails 76. The transpiration holes should be introduced in the rails with maximum density, subject to stress and strength limits on the rails for ensuring a useful long life during operation.

However, the two rails 76 preferably join the outer surface of the turbine case 48 at corresponding imperforate fillets 86 as shown in FIG. 4 which reduces stress therein during operation. Correspondingly, each of the two rails 76 has a generally rectangular radially outer end, which define tips 88 that are also imperforate and solid for enhancing sealing contact with the surrounding distribution manifold 54. The transpiration holes 84 are therefore located solely over the intermediate or radially middle portion of each rail 76 between the imperforate inner fillets and outer tips.

The annular distribution manifold 54 surrounds the two rails 76 within the limited space provided by the plenum 52 shown in FIG. 3, and includes one or more rows of aperture outlets 90 for channeling and discharging the control air 34 received from the first circuit 60 into the corresponding control cavities for flow through the transpiration holes 84.

As indicated above, the radially outer tips of the two rails are preferably imperforate so that the manifold 54 may be suitably sealingly joined thereto to enclose the middle cavity 80 and separate the middle cavity from the forward and aft cavities, except for the transpiration holes 84. Correspondingly, the outlets 90 of the manifold 54 are disposed solely in flow communication with the forward cavity 78 for initially supplying all of the control air 34 thereto.

The distribution manifold illustrated in FIGS. 3 and 6 may be suitably formed of relatively thin sheet metal and configured in axial section to fit within the limited space surrounding the two rails 76. A pair of ring seals 92, like piston rings, may extend around the full perimeter of the two rails 76 and are suitably retained against the inner surface of the manifold by an annular retainer 94 held by a plurality of retention bolts and spacers. The bolts have cooperating nuts exposed at the retainer 94, with corresponding heads exposed inside access cups bridging the inner and outer walls of the manifold.

As shown in FIG. 3, each of the two ring seals 92 axially abuts the imperforate tips of the corresponding rails and radially abuts the surrounding manifold, and may be compressed thereagainst by suitably tightening the retention bolts against the retainer 94.

In this way, the ring seals 92 and cooperating retainer 94 provide friction seals between the two rails 76 to sealingly enclose the middle cavity 80, and are conveniently suspended from the surrounding distribution manifold 54 itself.

During operation, the distribution manifold 54 cooperates with the two rails 76 for sequentially channeling the control air 34 between the forward, middle, and aft cavities 78,80,82 in turn. The control air is first supplied to the annular forward cavity 78 and then channeled axially through the transpiration holes 84 in the first control rail 76 into the middle cavity 80.

The control air then circulates circumferentially through the middle cavity 80 over the external surfaces of the two rails and is then discharged through the transpiration holes 84 in the second rail into the aft cavity 82.

In this way, the full volume and flowrate of the control air passes through each of the two control rails 76 in turn for maximizing the velocity of the control air through the individual transpiration holes 84 and thereby maximizing heat transfer in the rails.

In turn, this substantially increases the thermal response of the turbine case 48 for more quickly changing the internal diameter of the turbine shroud 44 surrounding the blade tips to correspondingly control the size of the radial clearance G.

And, the full annular circulation of the control air through the three cavities 78,80,82 improves the circumferential uniformity of the temperature thereof, and therefore improves roundness of the turbine case and supported shroud.

The distribution manifold 54 illustrated in FIG. 6 is preferably segmented into an annular forward chamber 96 separated from an annular aft chamber 98 by an imperforate circumferential baffle 100. And, as additionally shown in FIG. 3, the outlets 90 may be arranged in two rows spaced axially apart within the common forward cavity 78 and staggered circumferentially apart around the full perimeter of the turbine case.

Correspondingly, the two annular chambers 96,98 preferably share common aperture inlets 102 spaced about 180 degrees apart, which inlets are bound by axial baffles 104.

In this way, the corresponding inlets 102 are disposed in flow communication with the first circuit 60 for receiving the control air therefrom, and the two chambers 96,98 extend circumferentially oppositely from each of the two inlets. The control air 34 is then distributed in circumferentially opposite directions through the two annular chambers 96,98, which in turn feed the corresponding rows of outlets 90.

Since the two rows of outlets 90 are separately fed from opposite directions, the flowrate through the individual outlets 90 decreases in turn to the outlets furthest removed from the inlets. By providing counterflow in the two chambers 96,98 the collective flow through axially adjacent pairs of the outlets from the two chambers may be substantially uniform around the circumference of the distribution manifold 54.

The manifold 54 is preferably fabricated in two half-ring segments, with suitable circumferential end sockets joining together the complementary portions of the forward and aft chambers 96,98.

Since less radial space is available above the two control rails 76 as illustrated in FIG. 3, the aft chamber 98 is locally radially thinner, but extended axially longer than the forward chamber 96. In this way, the circumferential flow area of each of the two chambers 96,98 may be substantially equal to each other to improve the uniformity of distribution of the control air 34 from the two corresponding rows of outlets 90.

Fundamental to active clearance control in gas turbine engines is a turbine case from which is mounted the turbine shroud 44 illustrated in FIG. 3. The improved turbine case 48 with its perforate control rails 76 may be used in combination with the specifically configured distribution manifold 54 for greatly enhancing the heat transfer response rate of the turbine case.

The improved case 48 and manifold 54 may be used in the exemplary control system 50 disclosed above for additional advantages, but may also be used in otherwise conventional active clearance control systems which utilize heated or cooled air to control expansion and contraction of the turbine case.

In fundamental operation, the control air 34 is suitably supplied to the turbine case 48 which supports the shroud 44. The control air is then channeled through the transpiration holes 84 in the control rails 76 to control radial thermal expansion and contraction movement of the case 48, and in turn control the radial blade tip clearance.

In one mode of operation, the hot CDP air 34a is channeled through the cavities 78,80,82 and the transpiration holes 84 illustrated in FIG. 3 to rapidly heat and thermally expand the turbine case 48 during acceleration or reburst of the row of turbine blades 40 to prevent tip rubbing with the surrounding shroud 44. The increased heat transfer due to the transpiration holes 84 now makes possible the rapid expansion of the turbine case 48 during the rapid acceleration of the turbine blades at similar expansion rates to prevent undesirable reduction of the radial clearance.

Furthermore, during active clearance control cruise operation of the gas turbine engine, the cooled CDP air 34b may be channeled sequentially through the cavities 78,80,82 and the transpiration holes 84 to cool and thermally contract the turbine case 48 to reduce the radial clearance between the blade tips and turbine shroud 44.

As indicated above, the first bypass circuit 64 permits the new use of the hot CDP air 34a in the distribution network to quickly heat the turbine case 48 and increase its thermal response rate and decrease response time. And, further increasing that thermal response rate are the improved turbine case 48 and cooperating distribution manifold 54. This is particularly important in reburst operation which conventionally requires the use of a relatively large tip gap G of about 0.25 mm to prevent undesirable blade tip rubs.

In contrast, the improved performance of the ACC system disclosed above permits a substantial reduction of about half of the nominal blade tip clearance G to about 0.13 mm during normal operation of the engine. This smaller gap or clearance is now sufficient to accommodate reburst operation since the turbine shroud may thermally expand at a substantially higher rate than previously possible and better match the fast thermal expansion of the turbine rotor blades to prevent undesirable tip rubbing therebetween.

This smaller running clearance of the turbine blades correspondingly reduces combustion gas leakage therepast during operation and therefore further increases turbine efficiency and engine performance. The smaller clearance will also lead to a reduction in exhaust gas temperature (EGT) which has corresponding benefits including increased time of the engine on wing.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

The invention claimed is:

1. A turbine comprising:
   a row of turbine blades extending radially outwardly from a rotor disk;
   a turbine shroud surrounding said row of blades;
   a turbine case having radially inwardly projecting hooks supporting a hanger in turn supporting said shroud;
   said case including a pair of control rails extending radially outwardly above said hooks; and
   said rails are perforate for channeling therethrough pressurized control air to control thermal radial movement of said case at said hooks, and in turn radial position of said shroud.

2. A turbine according to claim 1 wherein said rails are spaced axially apart to define forward, middle, and aft flow cavities on opposite sides thereof, and each of said rails includes a multitude of transpiration holes extending axially therethrough in flow communication between said cavities.

3. A turbine according to claim 2 wherein said holes are inclined circumferentially through said rails for discharging said air circumferentially along said rails.

4. A turbine according to claim 3 further comprising an annular manifold surrounding said rails and including a row of outlets for channeling said air into said cavities for flow through said transpiration holes.

5. A turbine according to claim 4 wherein said manifold is sealingly joined to said rails to enclose said middle cavity, and said outlets are disposed in said forward cavity.

6. A turbine according to claim 5 wherein said manifold further comprises an annular forward chamber separated from an annular aft chamber by a circumferential baffle, and said outlets are arranged in two rows in said forward and aft chambers in flow communication with said forward cavity.

7. A turbine according to claim 6 wherein said forward and aft chambers share a common inlet bound by axial baffles for routing said air in opposite circumferential directions in said chambers.

8. A turbine according to claim 5 wherein said rails join said case at imperforate fillets, and have imperforate radially outer tips sealingly joined to said manifold.

9. A turbine according to claim 5 wherein said case further includes:
- a forward flange spaced axially forward from said rails to define said forward cavity therebetween;
- an aft flange spaced axially aft from said rails to define said aft cavity; and
- said middle cavity is defined axially between said rails.

10. A turbine according to claim 5 wherein said transpiration holes are arranged in rows staggered both circumferentially along said rails and axially through said rails.

11. A system for controlling radial clearance between a turbine shroud and a row of turbine blades in a gas turbine engine, comprising:
- a turbine case having radially inwardly projecting hooks for supporting said shroud, and a pair of rails extending radially outwardly above said hooks; and
- said rails are perforate for channeling therethrough pressurized air to control thermal radial movement of said case at said hooks, and in turn radial position of said shroud.

12. A system according to claim 11 wherein said rails are spaced axially apart to define forward, middle, and aft flow cavities on opposite sides thereof, and each of said rails includes a multitude of transpiration holes extending axially therethrough in flow communication between said cavities.

13. A system according to claim 12 wherein said holes are inclined circumferentially through said rails for discharging said air circumferentially along said rails.

14. A system according to claim 13 wherein said rails join said case at imperforate fillets, and have imperforate radially outer tips.

15. A system according to claim 14 wherein said case further includes:
- a forward flange spaced axially forward from said rails to define said forward cavity therebetween;
- an aft flange spaced axially aft from said rails to define said aft cavity; and
- said middle cavity is defined axially between said rails.

16. A system according to claim 15 wherein said transpiration holes are arranged in rows staggered both circumferentially along said rails and axially through said rails.

17. A system according to claim 15 further comprising an annular manifold surrounding said rails and including a row of outlets for channeling said air into said cavities for flow through said transpiration holes.

18. A system according to claim 17 wherein said manifold is sealingly joined to said imperforate rail tips to enclose said middle cavity, and said outlets are disposed in said forward cavity.

19. A system according to claim 18 wherein said manifold further comprises an annular forward chamber separated from an annular aft chamber by a circumferential baffle, and said outlets are arranged in two rows in said forward and aft chambers in flow communication with said forward cavity.

20. A system according to claim 19 wherein said forward and aft chambers share a common inlet bound by axial baffles for routing said air in opposite circumferential directions in said chambers.

21. A system according to claim 15 further comprising:
- an annular hanger mounted in said hooks; and
- said turbine shroud is mounted in said hanger.

22. A method of using said system according to claim 15 comprising:
- supplying said air to said forward cavity;
- channeling said air from said forward cavity to said middle cavity through said transpiration holes in one of said rails; and
- channeling said air from said middle cavity to said aft cavity through said transpiration holes in the other rail.

23. A method according to claim 22 further comprising channeling heated air through said cavities and transpiration holes to heat and thermally expand said case during acceleration of said row of blades to prevent tip rubbing with said shroud.

24. A method according to claim 22 further comprising channeling cooling air through said cavities and transpiration holes to cool and thermally contract said case during steady state cruise operation of said row of blades to reduce said radial clearance.

25. A method for controlling radial clearance between a turbine shroud and row of turbine blades in a gas turbine engine, comprising:
- supplying pressurized control air to a turbine case supporting said shroud; and
- channeling said air through transpiration holes in control rails extending radially outwardly from said case to control radial thermal movement of said case, and in turn controlling said radial clearance.

26. A method according to claim 25 further comprising channeling said control air sequentially between forward, middle, and aft cavities defined by a pair of said rails on said case.

27. A method according to claim 26 further comprising channeling heated air through said cavities and transpiration holes to heat and thermally expand said case during acceleration of said row of blades to prevent tip rubbing with said shroud.

28. A method according to claim 26 further comprising:
- cooling said control air in a heat exchanger; and
- channeling said cooled air from said heat exchanger through said cavities and transpiration holes to cool and thermally contract said case during steady state cruise operation of said row of blades to reduce said radial clearance.

* * * * *